United States Patent [19]
Baxter et al.

[11] Patent Number: 5,546,147
[45] Date of Patent: Aug. 13, 1996

[54] LENS DEPLOYMENT MECHANISM FOR COMPACT CAMERA

[75] Inventors: Dennis E. Baxter, East Rochester; Leonard Richiuso, Rochester, both of N.Y.

[73] Assignee: Eastman Kodak Company, Rochester, N.Y.

[21] Appl. No.: 347,550

[22] Filed: Nov. 30, 1994

[51] Int. Cl.⁶ .......................... G03B 17/04; G03B 5/02; G03B 15/03
[52] U.S. Cl. ................. 354/187; 354/195.1; 354/149.11
[58] Field of Search ............................. 354/149.11, 187, 354/195.1

[56] References Cited

U.S. PATENT DOCUMENTS

| | | | |
|---|---|---|---|
| 2,895,781 | 7/1959 | Latter et al. | 192/143 |
| 4,264,174 | 4/1981 | Lange et al. | 354/187 |
| 4,365,884 | 12/1982 | Knapp | 354/187 |
| 4,424,720 | 1/1984 | Bucchianeri | 74/89.15 |
| 4,557,571 | 12/1985 | Reibl | 354/149.11 |
| 4,575,210 | 3/1986 | Yamada et al. | 354/400 |
| 4,597,657 | 7/1986 | Wakabayashi | 354/187 |
| 4,752,796 | 6/1988 | Tsukahara et al. | 354/187 |
| 5,014,077 | 5/1991 | Yomogizawa et al. | 354/187 |
| 5,150,260 | 9/1992 | Chigira | 359/694 |
| 5,212,510 | 5/1993 | Baxter | 354/187 |
| 5,231,436 | 7/1993 | Glogan et al. | 354/149.11 |
| 5,255,033 | 10/1993 | Dassero | 354/149.11 |
| 5,270,754 | 12/1993 | Newman | 354/149.11 |
| 5,307,103 | 4/1994 | Machida | 354/187 |
| 5,331,362 | 7/1994 | DiRisio | 354/149.11 |
| 5,461,441 | 10/1995 | Kotani | 354/187 |

*Primary Examiner*—Michael L. Gellner
*Assistant Examiner*—Michael Dalakis
*Attorney, Agent, or Firm*—Peter J. Bilinski; Joseph F. Breimayer

[57] ABSTRACT

A compact camera having a retractable objective lens carrier that is associated with a flip open flash unit and lens cover to move from a retracted, parked position to an extended, home position on initial movement of the lens cover to an open, unfolded position, to move to and from an in-focus picture taking position prior to and following taking a picture, and to move back to the parked position from the home position as the lens cover is moved to a closed or folded position. The lens carrier is guided for movement along a guide assembly and urged toward the parked position by a retraction spring bias force. Movement between the parked and home positions is effected by a lens deployment lever interconnecting the lens carrier and the lens door operating in opposition to or with the bias force on opening or closing the lens cover, respectively. An auto-focus drive mechanism is selectively operable by the user on depression of the shutter release button prior to taking a picture for making engagement with the lens carrier and moving it on the guide assembly to an in-focus position determined by the camera range finding system. After a picture is taken or the shutter button is otherwise released, the auto-focus drive mechanism is reversed to return the lens carrier to the home position and to disengage the auto-focus drive mechanism from the lens carrier.

9 Claims, 10 Drawing Sheets

LENS DEPLOYMENT MECHANISM FOR COMPACT CAMERA

FIELD OF THE INVENTION

The present invention relates generally to the field of photography, and in particular to compact folding cameras.

BACKGROUND OF THE INVENTION

The classical folding camera is one in which a lens carrier for an objective lens is translatable along the lens optical axis between a storage position retracted in the camera body and a picture-taking position extended from the camera body. Typically, a lens cover is pivotally connected to the camera body for swinging movement between a closed or folded position in front of the objective lens when the lens carrier is in its storage position and an opened or unfolded position removed from the objective lens when the lens carrier is in its taking position. See commonly assigned U.S. Pat. No. 4,557,571, for example.

In a folding camera such as disclosed in the '571 patent, when the lens cover is swung from its opened position to its closed position, it pushes the lens carrier inwardly of the camera body to translate the lens carrier from its taking position to its storage position. Conversely, when the lens cover is swung from its closed position to its opened position, spring means are free to push the lens carrier outwardly of the camera body to translate the lens carrier from its storage position to its taking position.

A further U.S. Pat. No. 4,365,884 shows a folding camera wherein the lens carrier is associated with the lens cover to extend to the taking position as the lens cover is swung to its opened position and to retract to the storage position as the lens cover is swung to its closed position. A locking device is provided for locking the lens carrier in its picture taking position. The lens carrier includes an integral pin which, when the lens carrier is moved to its taking position, passes beneath a latching lever to come to rest at the far side of the latching lever, where it is retained by the latching lever. An intricate linkage is needed to separate the latching lever from the pin to allow the lens carrier to be returned to its storage position.

In commonly assigned U.S. Pat. Nos. 5,212,510 and 5,231,436, compact cameras are disclosed having a flash unit combined in a flip open lens cover which, in a folded closed position, covers the camera taking lens assembly. A retractable lens carrier operates as the lens cover is flipped open or closed to move the camera taking lens assembly outward to a picture-taking position or inward to a storage position, respectively. The flash unit built into the end of the flip open lens cover is separated from the taking lens a distance that helps alleviate "red eye".

In the '436 patent, a locking device locks the lens carrier in a fixed picture-taking position, and a single cam piece disengages the locking device on manual movement of the lens cover to the closed position to allow retraction of the lens carrier to its storage position.

In the '510 patent, the lens cover is made elastic, or includes an elastic pad piece, to avoid abrasion of the taking lens on closure of the lens cover. A mechanism is described for flipping up and returning down a front range finder lens when the lens cover is flipped open and closed, respectively. No particular mechanism is shown for advancing and retracting the lens carrier between the picture taking and storage positions.

In a modern, compact auto focus camera, the camera is provided with a motorized lens drive mechanism for moving the taking lens to a proper in-focus position in response to a signal from a range finding system. In the context of a flip open lens cover of the type shown in the above-referenced patents and as employed in the KODAK® Cobra camera models, this movement of the lens carrier from the storage position to an in-focus position and back to the storage position must occur while the lens cover is flipped up and before the lens cover can be flipped down again, respectively.

In today's marketplace, customers are asking for small, compact, "point and shoot" cameras which they can take anywhere comfortably. The customer also wants the interval time between each picture taking sequence to be minimized, typically 200–300 milliseconds for a non-flash exposure. In all such compact folding cameras, a danger exists that the lens cover may be forced closed before the taking lens assembly has time to retract to the storage position. This is particularly true when the lens carrier is driven by a lens focus motor under the control of an auto-focus control system to an extended position for taking a picture, and the lens cover can be flipped closed faster than the lens focus motor can operate. This could have an effect on the camera's ability to focus the lens. Such failure modes will cause customers to return their cameras and ultimately cause customer dissatisfaction.

SUMMARY OF THE INVENTION

It is therefore a principal object of the present invention to provide a lens deployment mechanism for a foldable camera that provides for rapid movement of the camera taking lens carrier between the storage position and a picture taking position defined and controlled by an auto-focus system to ensure that the closure of the lens cover does not damage the taking lens.

According to the invention, there is provided an improved photographic camera wherein a flip open unit is manually movable between an opened position and a closed position, a retractable objective lens carrier is associated with the flip open unit to move the taking lens to an extended picture taking position as the flip open unit is moved to its opened position and back to a retracted storage position as the flip open unit is moved to its closed position.

In accordance with the present invention, the lens cover movement to the open position causes lens carrier movement from a storage or "parked position", fully collapsed into the camera body, to an intermediate, deployed "home position" outside the confines of the camera body. During a typical picture taking sequence for an auto focus camera, the proper in-focus position of the taking lens is determined and the lens carrier is moved from the home position to the in-focus position. After the exposure is made, the lens carrier is moved back to the home position, from which it may be returned to the parked position on closure of the lens cover.

Each time that an a picture is taken with the lens cover already open, the taking lens is moved from the home position to the proper in-focus position determined by the auto focus system for the particular scene being photographed and then moved back to the home position. A lens carrier drive mechanism is engaged to make the movement to and from the in-focus position and is then disengaged. Opening and closure of the lens cover effects movement of the lens carrier between the parked and home position with the lens carrier drive mechanism disengaged.

In accordance with the invention, an improved photographic camera having a camera body and a flip open lens cover that can be manually movable between a closed position covering and protecting a camera taking lens and an open position exposing the taking lens for photographing scenes further comprises: a movable objective lens carrier for supporting the taking lens; means for guiding the lens carrier for movement between a parked position when the lens cover is in the closed position and a home position deployed outward from the camera body when the lens cover is in the open position and a further in-focus position; lens deployment means interconnected between the lens cover and the lens carrier for effecting movement of the lens carrier along the lens carrier guiding means between the parked position and the home position in response to movement of the lens cover; and lens focus drive means operable by the user upon opening the lens cover to the open position for engaging with the lens carrier and moving the lens carrier on the guiding means from the home position to the in-focus position prior to taking a picture and operable after taking a picture for moving the lens carrier on the guiding means to the home position and disengaging from the lens carrier.

Advantageously, the present invention provides for the automatic engagement and disengagement of the taking lens auto focus drive mechanism with the taking lens carrier dependent only on a picture taking event initiated by the user and only for so long as it takes to set the focus and to return to the home position. Thus, in the absence of or following completion of a picture taking sequence, the lens carrier is freed from the lens auto focus drive mechanism and is deployable between the home and parked positions synchronously with the mechanical movement of the lens cover between the lens cover open and closed positions. The lens cover can not be closed so quickly that can cause damage to the lens.

In addition, the deployment of the lens carrier to the home position sets the taking lens focus to a near infinity position from which the lens carrier may be rapidly driven to the in-focus position selected by the automatic focus control system prior to making the exposure. After each exposure, the camera taking lens is moved back to the home position to either allow the lens cover to be closed or to be driven to the next in-focus position. This provides the desired 200–300 millisecond interval time between each picture taking sequence.

The lens deployment mechanism is therefore simple and compact allowing the camera to operate in the normal manner of an auto focus, auto exposure camera.

Other objects, advantages and features of the present invention will become apparent from the following specification when taken in conjunction with the accompanying drawings.

DETAILED DESCRIPTION OF THE PREFERRED EMBODIMENT

Figure 1:
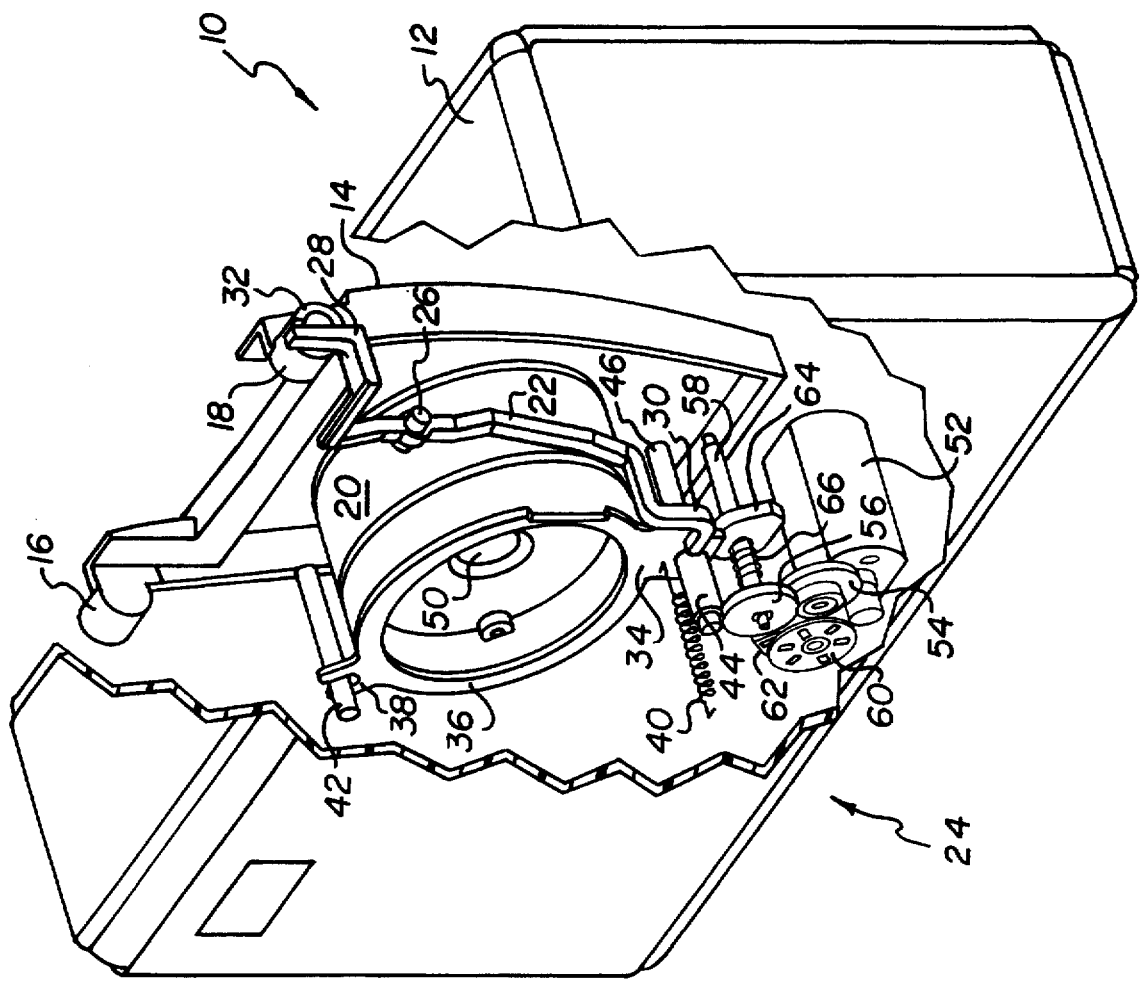
FIG. 1 is a rear perspective view of the components of the taking lens assembly in conjunction with the flip open flash unit and lens cover in the lens parked position and the lens cover closed position.

The invention is disclosed as being embodied in a compact 35 mm camera with a flip open flash unit built into the lens cover. Because such photographic cameras have become well known, as typified by the cameras shown in the above-referenced patents and as described above, this description and the drawings are directed in particular to camera components forming part of or cooperating directly with the apparatus of the preferred embodiment of the invention. It is to be understood, however, that camera elements not specifically shown or described may take various forms known to persons of ordinary skill in the art.

Referring now to the drawings, FIGS. 1–6 show a camera 10 comprising a cut-away camera body 12 revealing a lens cover 14 (shown without the integral flash unit for simplification of illustration) hinged at hinge ends 16 and 18 to the camera body 12, the taking lens barrel or carrier 20, the deployment lever 22, the lens drive assembly 24, and biasing and guiding components thereof. The deployment lever 22 is pivotal about a hinge 26 at a camera body 12 hinge point and has a first end 28 and a second end 30. The first end 28 bears against a cam 32 formed at the lens cover hinge end 18, and the second end 30 bears against a tab 34 of the lens carrier barrel flange 36. The flange 36 includes a second U-shaped guide portion 38 and is coupled to one end of a bias spring 40, the other end of which is attached to the camera body 12. The U-shaped guide portion 38 straddles a guide shaft 42 attached at both ends of the body 12, and the U-shaped guide portion 36 is attached to an elongated sleeve 44 surrounding a second guide shaft 46 that is also fixed to the frame.

Figure 2:
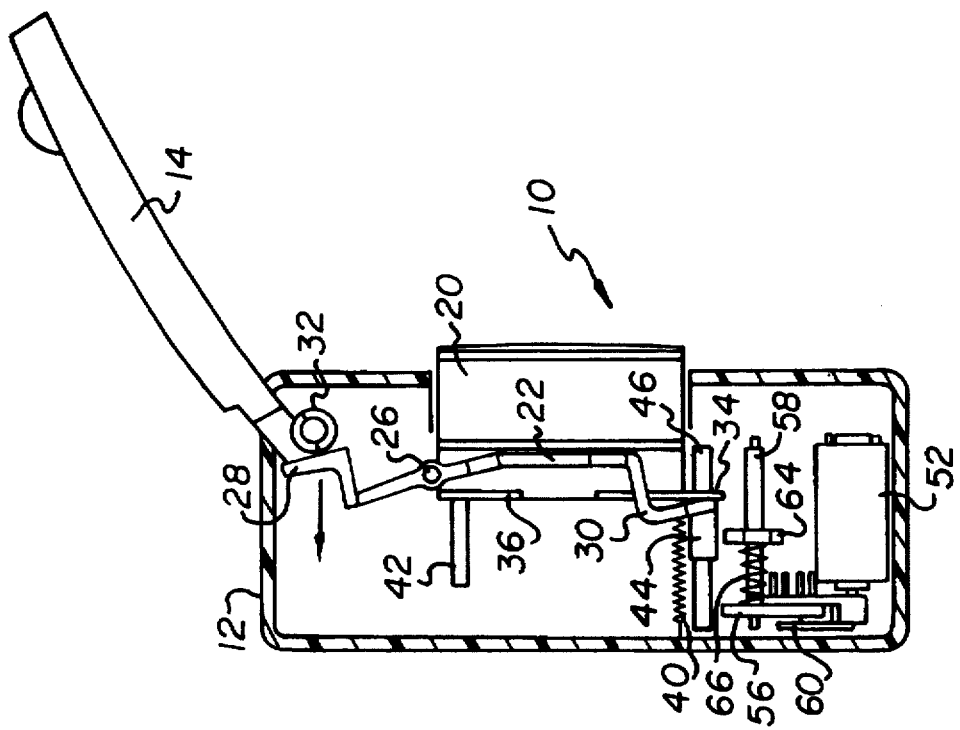
FIG. 2 is a side view of the relationship of the lens deployment lever movement and the lens cover cam during opening of the lens cover.
Figure 3:
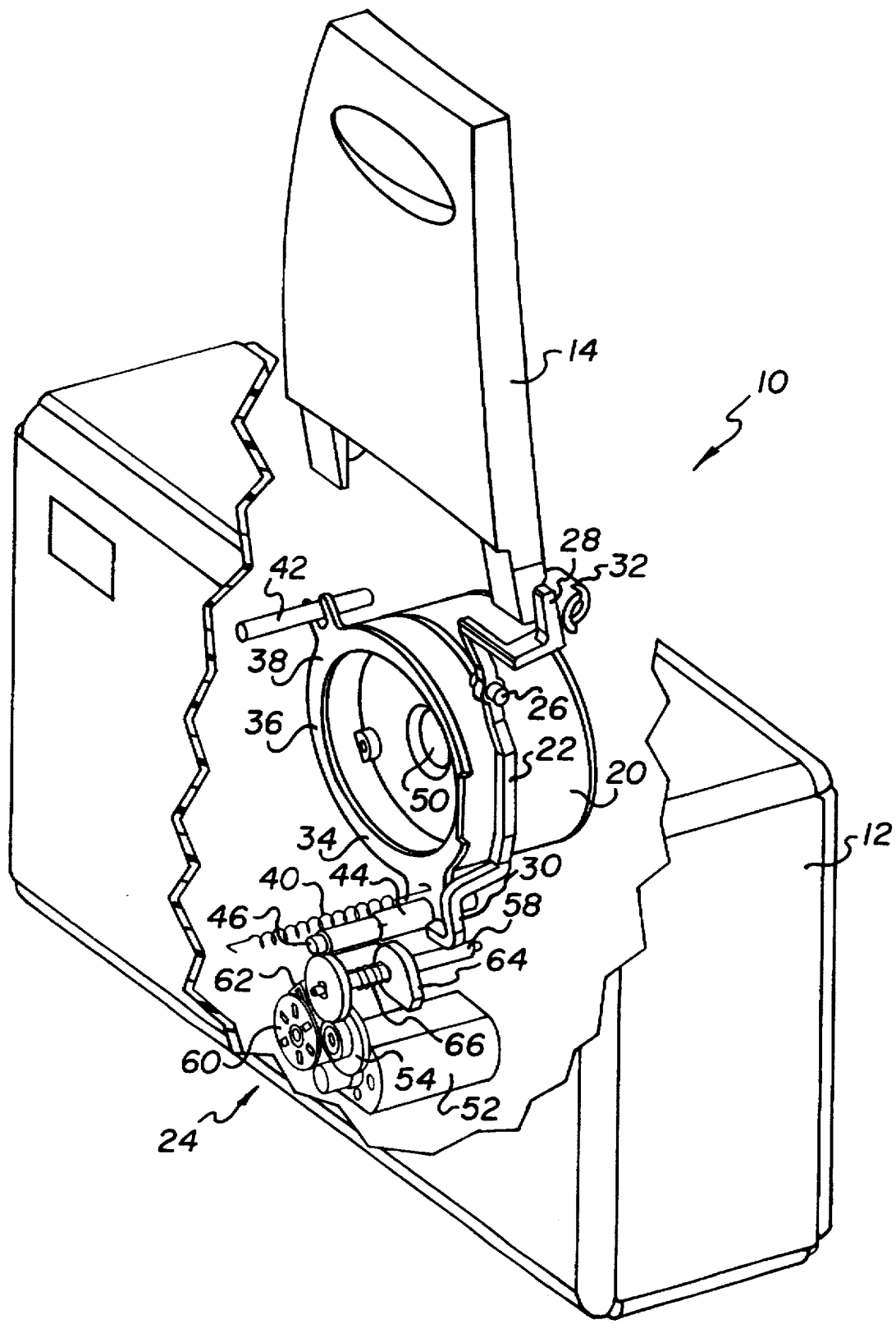
FIG. 3 is a rear perspective view of the components of the taking lens assembly in conjunction with the flip open flash unit and lens cover in the lens home position and the lens cover open position.

Turning to FIG. 2, it schematically depicts the interaction of the ends 28 and 30 of the deployment lever 22 with the barrel flange 36 and the cam 32, respectively, during opening motion of the lens cover 14. FIG. 3 depicts the apparatus of FIG. 1 with the lens cover 14 in the full open position and the lens carrier 20 advanced out of the camera body 12 to the home position. During the opening of the lens cover 14 from the closed position of FIG. 1 and through the intermediate position of FIG. 2, the deployment lever 22 is pivoted on the shaft 26 by the cam 32 bearing against the deployment lever end 28. The other deployment lever end 30 bears against the tab 34, and lens carrier 20 is advanced outward from the camera body 12 along the guide shafts 42 and 46 against the bias force of the spring 40. The lens cover 14 is continued to be pivoted to the full open, upright position of FIG. 3, where the flash unit (not shown) built into the inside of lens cover 14 is aimed at the scene to be photographed.

In the lens cover positions of FIGS. 2 and 3, the taking lens carrier 20 is in the home position, which corresponds to a focus setting close to the infinite focus position of the taking lens 50 for the particular camera exposure gate. As described hereafter in conjunction with the operation of the auto focus drive mechanism, during each picture taking sequence, the taking lens 50 is moved from the home position to the appropriate in-focus position and back to the home position. After a picture taking sequence is completed, the lens carrier 20 and taking lens 50 are again in the home position, and the lens cover 14 may be returned to the closed position of FIG. 1 without damaging the lens carrier 20, or the mechanism for advancing and retracting the lens carrier 20.

In accordance with one aspect of the present invention, the lens deployment mechanism as described to this point may advantageously be used in less expensive, fixed focus cameras to reduce the cost of parts. However, it is especially adapted, in accordance with the present invention to be used with the auto focus drive mechanism 24 in a fully automatic auto focus picture taking sequence described as follows.

The drive mechanism 24 includes a lens deployment or drive motor 52 coupled through a reduction gear 54 to a driven lead screw gear 56 of a lead screw 58 and to a chopper wheel 60 that interrupts light to an opto-sensor 62 to provide a lens position count for a motor control feedback system. An eccentrically shaped drive arm 64 is threaded onto the turns of the lead screw 58 and a biasing spring 66 extends between the driven lead screw gear 56 and the drive arm 64. The biasing spring 66 increases the friction between the mating threads of the lead screw 58 and the drive arm 64 to prevent rotation of the drive arm 64.

In FIGS. 1–3, the drive motor 52 is not energized, and arm 64 is shown pivoted out of the way from the deployment lever end 30 and the tab 34 of the barrel flange 36. Normally, with the drive motor 52 disabled, the eccentrically shaped drive arm 64 is clear of the path of travel of the deployment lever end 30 and the tab 34, so that the lens carrier 20 deployment from the parked to the home position described above through the action of deployment lever 22 can take place simply on opening the lens cover 14.

Figure 4:
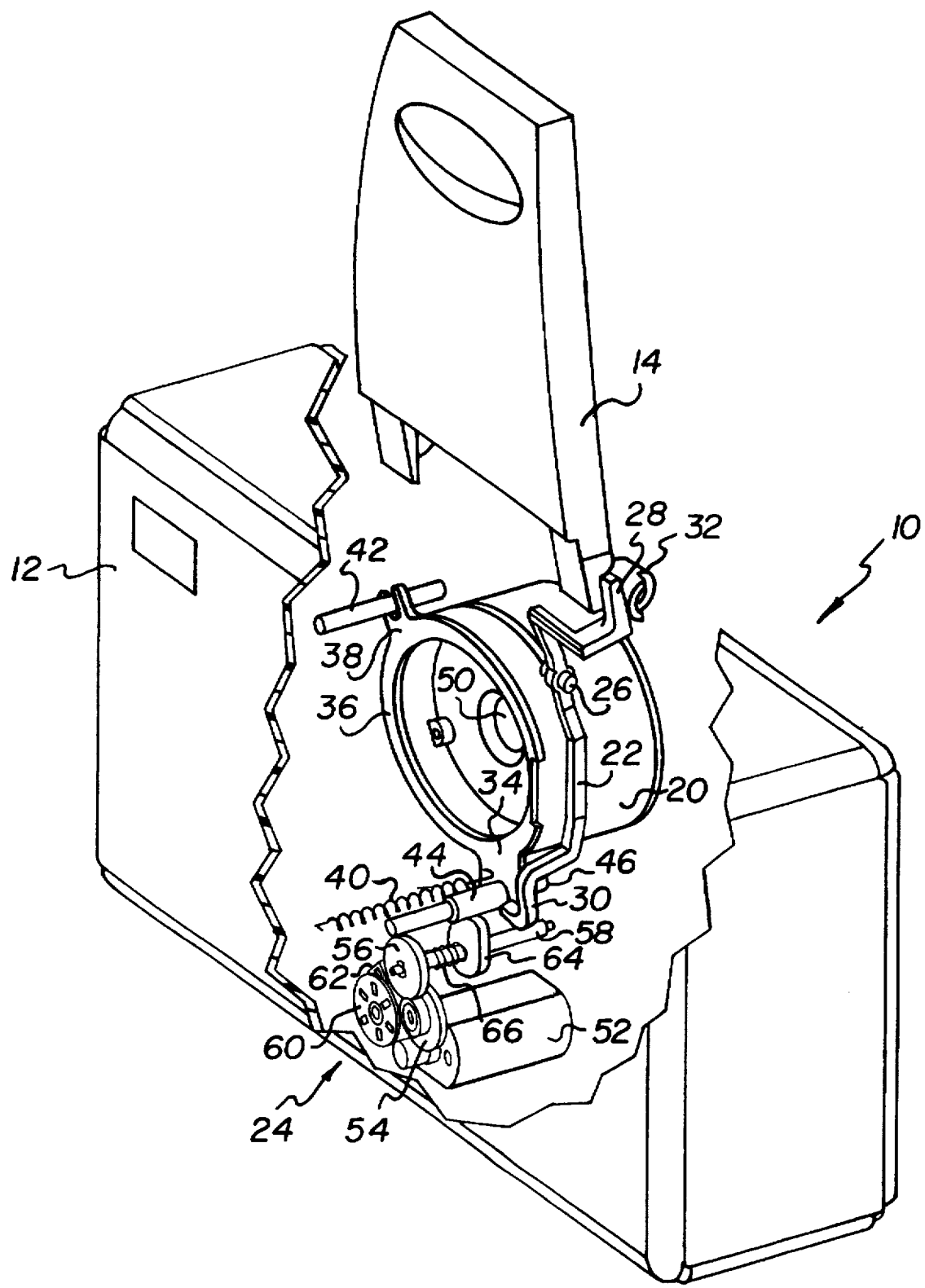
FIG. 4 is a rear perspective view of the components of the taking lens assembly in conjunction with the flip open flash unit and lens cover in the lens home position and the lens cover open position with the lens drive arm poised to commence driving the lens carrier to the lens in-focus position.
Figure 5:
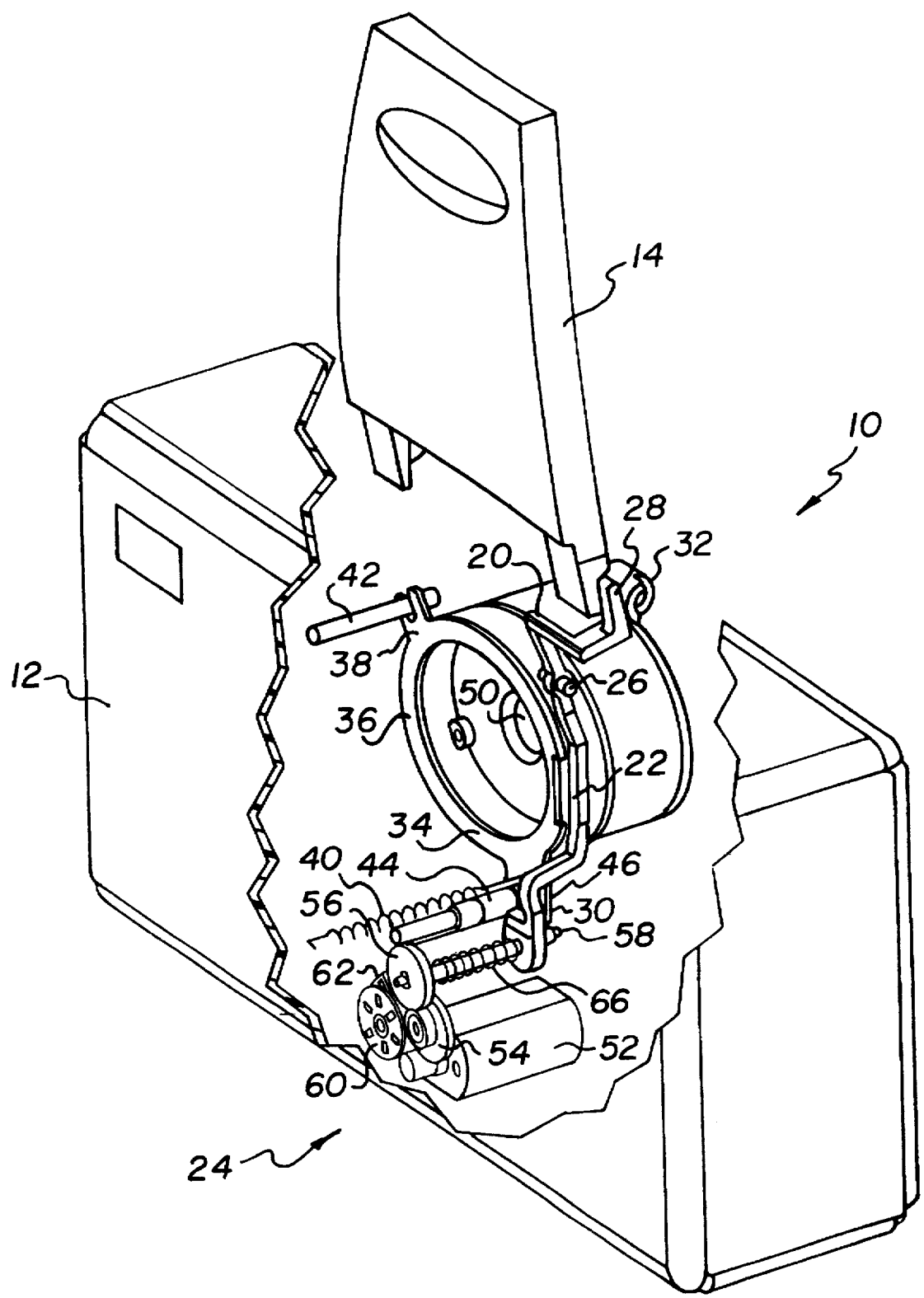
FIG. 5 is a rear perspective view of the components of the taking lens assembly in conjunction with the flip open flash unit and lens cover in the lens home position and the lens cover open position with the lens drive motor driving the lens carrier to the lens in-focus position.

However, as shown in FIG. 4, when the auto focus, lens drive motor 52 is first energized, it rotates the lead screw 58 counter-clockwise, and the thread friction due to biasing spring 66 rotates the eccentrically shaped drive arm 64 up and into contact with the sleeve 44 just below the deployment lever end 30, causing the drive arm 64 to stop rotating. Continued drive motor 52 rotation of the lead screw 58, however, causes the drive arm 64 to travel along the lead screw 58 and to move the tab 34 and taking lens carrier 20 outward against the bias force of spring 40 and to the in-focus position defined by the auto-focus system. The deployment lever 22 remains in the position that defines the lens carrier home position. The final in-focus position depicted in FIG. 5 is maintained until the picture taking sequence is completed.

At that point, the drive motor 52 is reversed in direction, reversing the direction of rotation of lead screw 58. Drive arm 64 moves out of contact with tab 34 and swings back to the disengaged position, as depicted in FIG. 3. The drive motor 52 continues to be driven in the reverse direction until the camera lens carrier 20 is returned to the home position of FIG. 3.

With a typical lead screw lens deployment mechanism, the lead screw 58 can only move as fast as the combination lead screw, gear train, and motor of the lens drive assembly 24 will allow it to move. In accordance with the present invention, the lens carrier 20 and the lead screw 58 are disengaged by using the independent drive arm 64 in the manner described above. The drive arm 64 rotates in and out of engagement with the tab 34 facilitated by the biasing force of spring 66. Constraining the amount of rotation of the drive arm 64 provides for changing rotational motion to translational motion of the drive link. The biasing spring 66 is employed to take up the backlash and to increase friction in the threads of the drive arm 66 and the lead screw 58. Biasing spring 66 could be applied to either side of the drive arm 64, but is preferred in the position shown in all the figures in order to keep the direction of forces provided by springs 40 and 66 opposed in the system.

Figure 6:
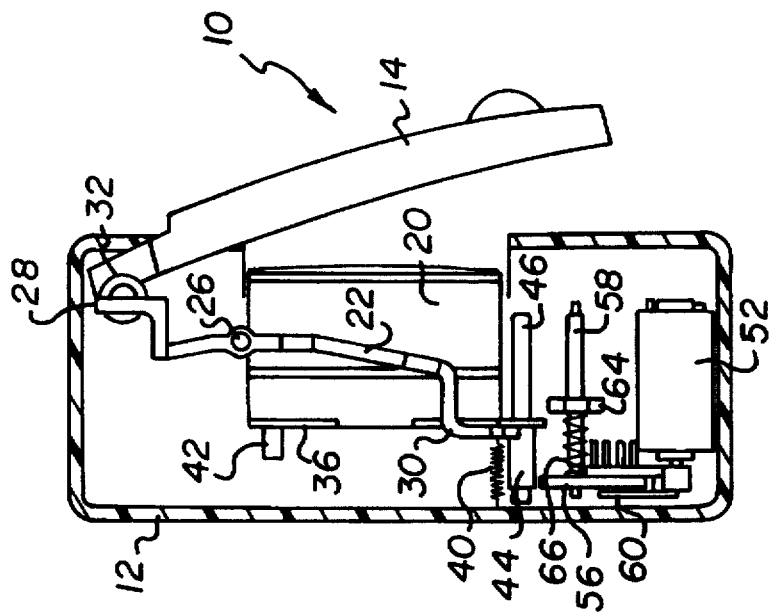
FIG. 6 is a side view of the relationship of the lens deployment lever movement and the lens cover cam during closure of the lens cover.

Turning to FIG. 6, a side view of the relationship of the lens deployment lever movement and the lens cover cam during closure of the lens cover is depicted. At this point in the closure, the deployment arm end 28 is just released from the cam 28, and the bias force of spring 40 causes the deployment arm 22 to pivot back at end 30 as the lens carrier 20 is retracted to the parked position.

Figure 7:
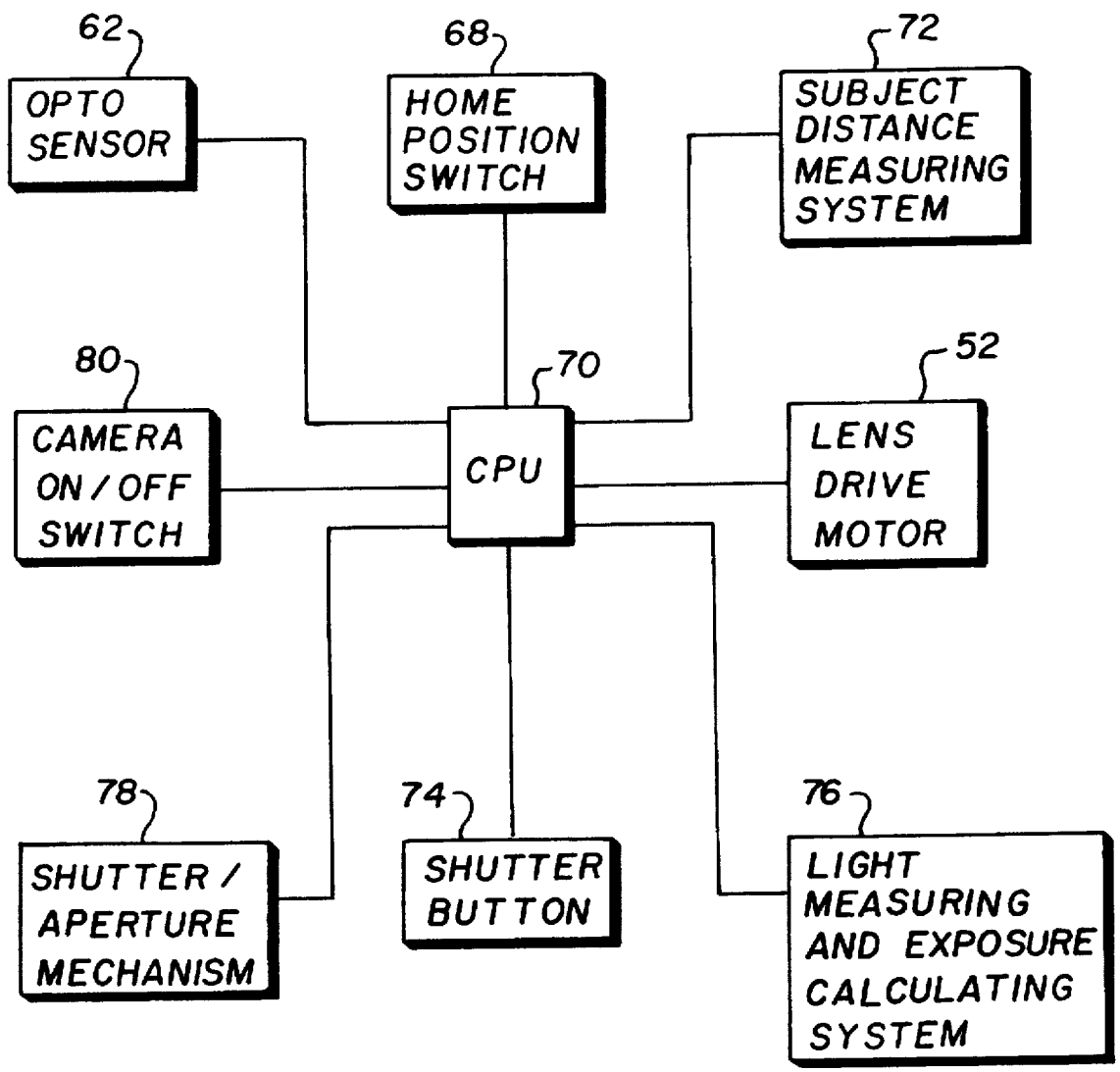
FIG. 7 is a simplified block diagram of the operating system of the invention.
Figure 8A:
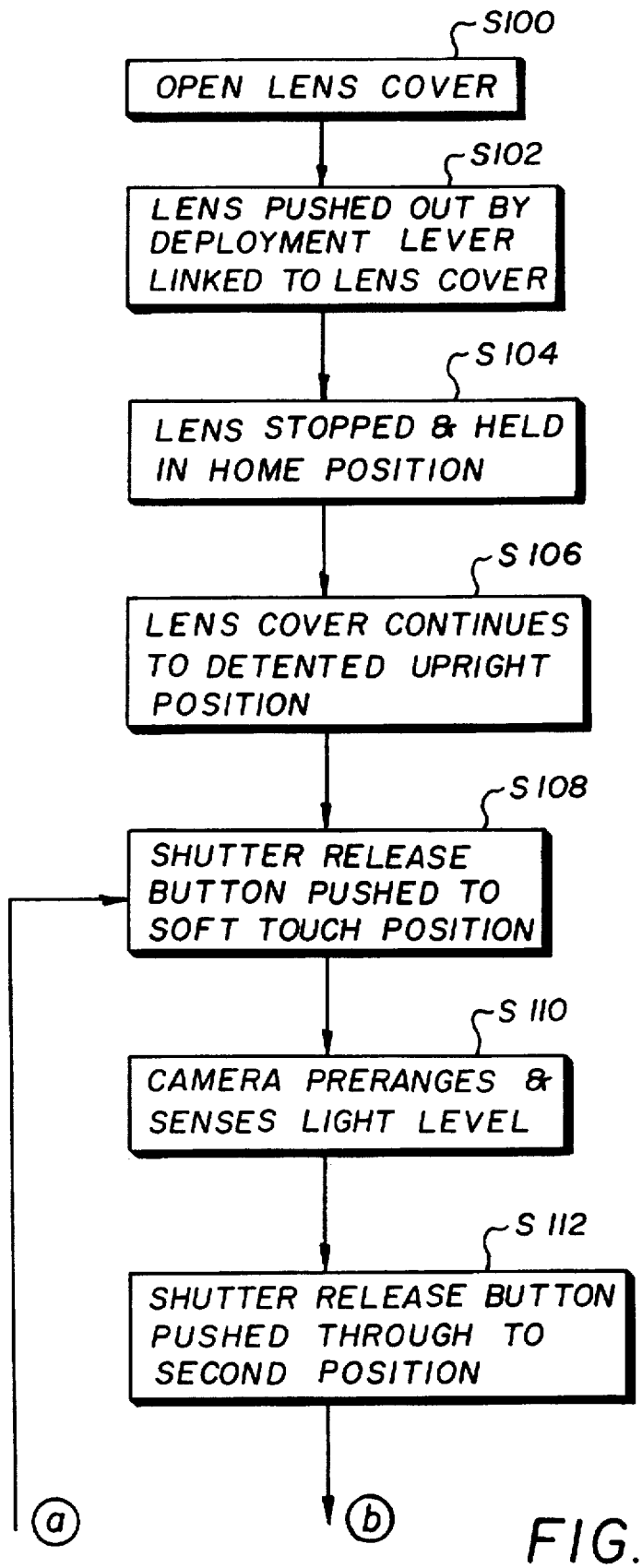
FIG. 8 is a flowchart illustrating the method of operating the components of the camera depicted in FIGS. 1–6.
Figure 8B:
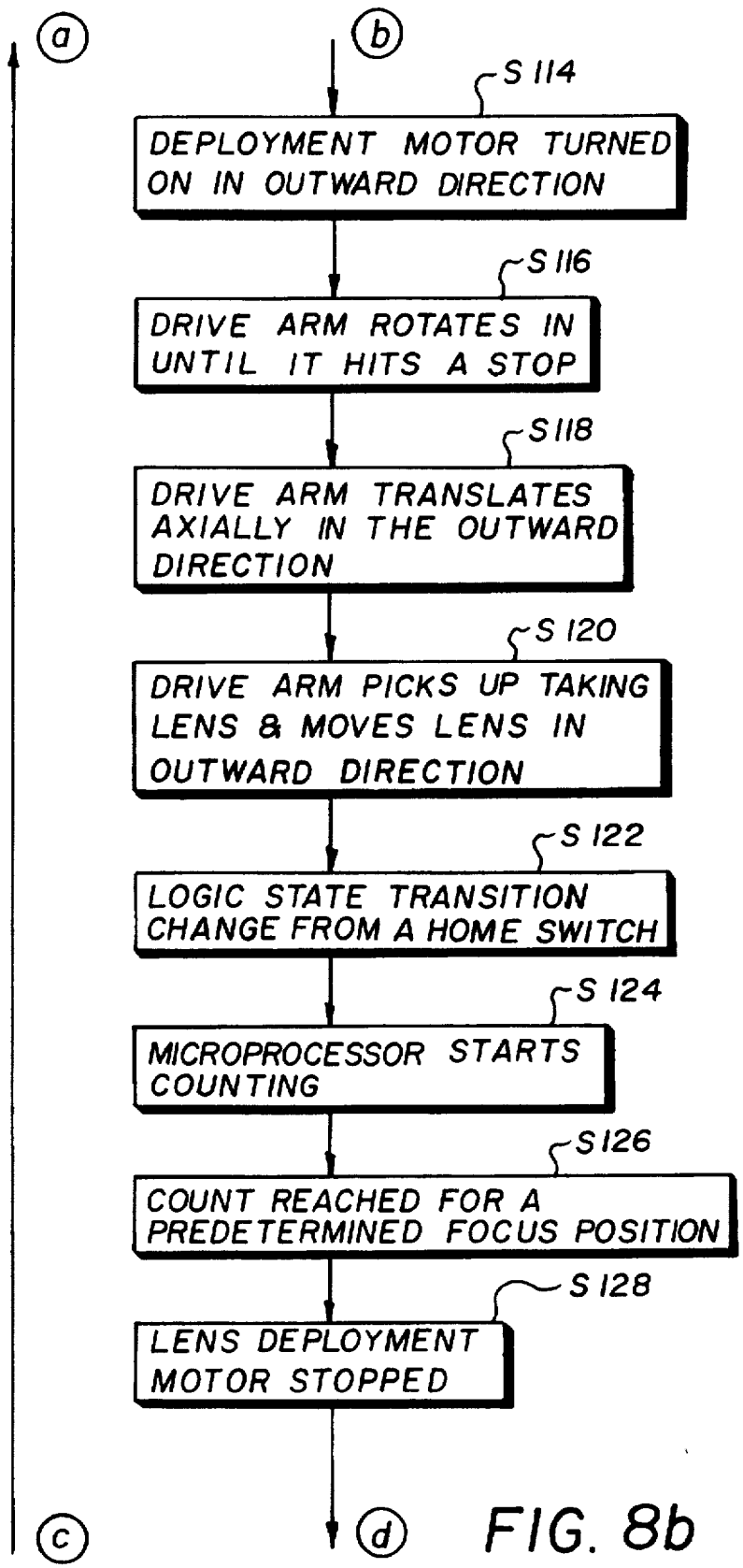
Figure 8C:
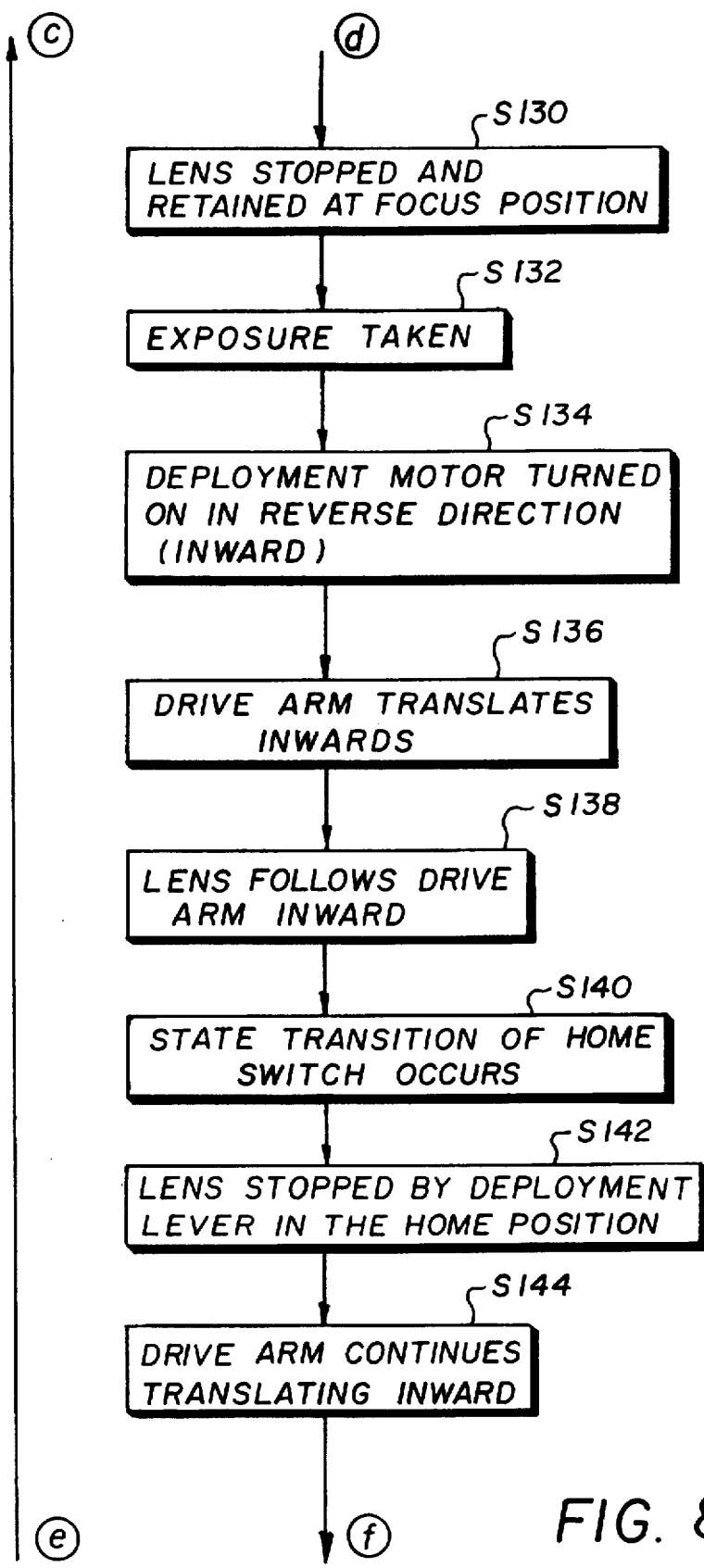
Figure 8D:
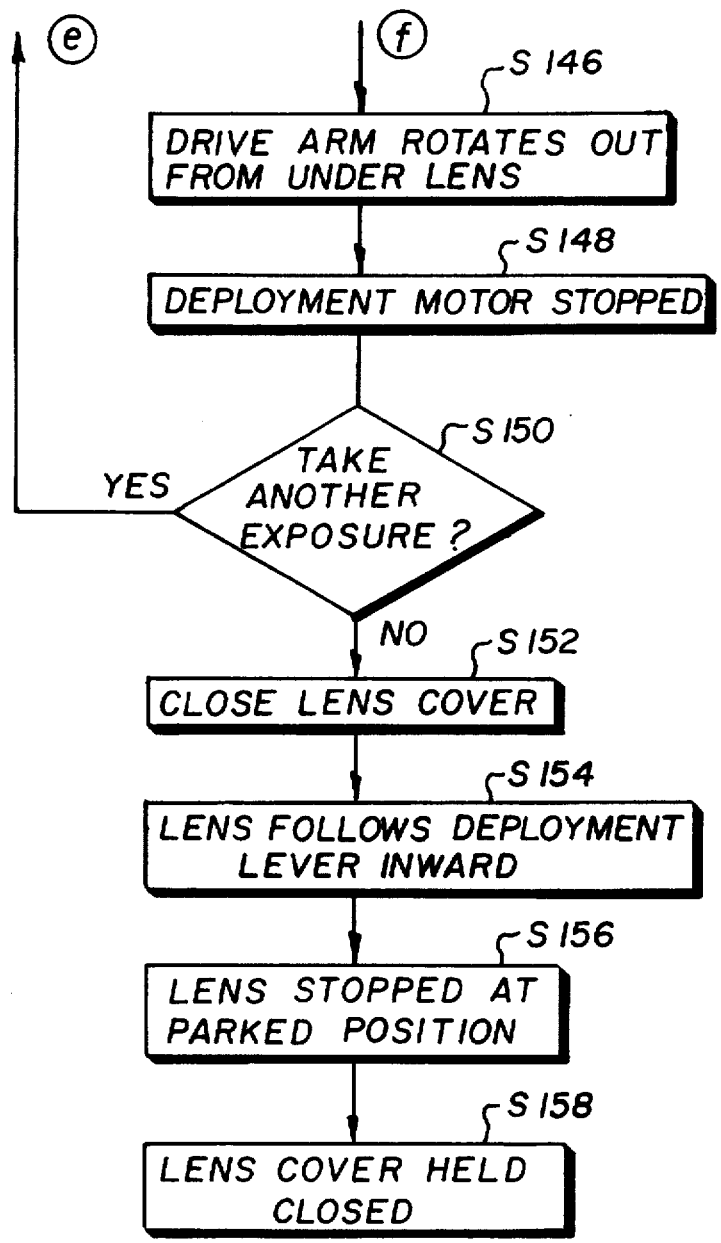

In order for the lens carrier to be advanced to and from the in-focus position during each picture taking sequence, the drive motor 52 must be energized to rotate the lead screw in the counter-clockwise and clockwise directions a certain number of revolutions. FIG. 7 is a block diagram of a camera electronic operating system which controls the movement of the lens drive motor during a picture taking sequence as illustrated in the flowchart of FIG. 8. A central processor unit (CPU) 70 (including, for example, a microprocessor based micro-computer) is activated by a camera on/off switch 80 or the like and when activated responds to the partial depression of the image capture or shutter release button 74 commencing a picture taking sequence. During a picture taking sequence, the CPU 70 operates the subject distance measuring system 72 and the light measuring and exposure calculation system 76 determine the exposure parameters of a scene imaged by the camera taking lens 50. The CPU 70 powers the lens drive motor to rotate the lead screw 58 counter-clockwise a number of revolutions depending on the determined subject distance to move the taking lens 50 from the home position to the in-focus position as described above. The CPU 70 also sets the taking lens 50 aperture and actuates the shutter release mechanism 78 to make the exposure.

When the exposure is completed, the CPU 70 also energizes the lens drive motor 52 to rotate the lead screw 58 clockwise to move the lens carrier 20 back to the home position. A flash illumination system (not shown) may also be controlled by the CPU 70 to operate during the shutter opening if deemed necessary in response to the exposure measuring and exposure calculation system 76.

A home position switch 68 is also provided that changes state when the lens carrier 20 is moved from and back to the home position in the picture taking sequence. The home position switch may be a set of wiper contacts bearing against a conductive pattern on the lens carrier 20 when it is in the home position. The change of state occurring just after the lead screw begins rotating counter-clockwise is sensed by the CPU 70, causing it to count the output pulses of the opto-sensor 62. The pulse count is employed in setting the in-focus position, since the pulse count and focus-positions are correlated for the camera in look-up tables in the CPU 70. When the count corresponding to the in-focus position is reached, the CPU de-energizes the lens drive motor 52. The home position switch 68 again changes state upon the return of the taking lens 50 to the home position, and the CPU 70 responds by halting energization of the lens drive motor 52.

FIG. 8 is a flowchart illustrating the theory and method of operating the components of the camera depicted in FIGS. 1–6, implemented in the camera electronic operating system of FIG. 7, as steps S100–S158. Certain of the steps are implemented in the microprocessor-based CPU 70 and other steps reflect operations of the user or the above described camera apparatus.

At step S100, the lens cover 14 is opened, and the lens carrier 20 is pulled out to the home position in steps S102 and S104. The lens cover 14 is fully opened in step S106, and the user aims the camera at a scene and depresses the image actuator or shutter release button to a soft touch position in step S108 at which point the camera auto-focus and auto exposure systems are activated to pre-range the distance and sense the scene light level in a manner well known in the art. It will be understood that a suitable interlock will be provided so that the auto-focus control system cannot be invoked with the lens cover 14 closed. A count is derived related to the number of drive motor 52 revolutions needed to rotate the drive screw 64 and axially translate the drive arm 64 to move the taking lens carrier from the home position to the in-focus position. Continued depression or depression to a further position of the shutter release button energizes the auto focus drive motor 52 to rotate, thereby rotating the drive arm 64 upward and into alignment with the tab 34 and translating the drive arm 64 axially into engagement with the tab 34, as shown in steps S110–S120 and illustrated in FIG. 4.

At step S122, a logic state transition change is sensed from the home position switch 66 that is open in the lens carrier home position and is closed when the auto focus lens drive motor 52 begins to operate. As the chopper 60 is rotated, output pulses from the opto-sensor 62 are counted in the camera microprocessor based central processing unit 70 in step S124. The count is compared to the predetermined count for the predetermined in-focus position provided by the auto focus system 72 in step S126. The drive motor 52 is stopped in step S130 when the counts match. The steps S108–S130 may consume 200–300 ms, and the shutter is opened and closed to take the picture in step S132 in a manner known in the art.

On completion of the exposure, the central processing unit 70 provides a drive signal to operate the drive motor 52 in the reverse direction in step S134. Although the rotation direction of the lead screw 58 is reversed, the drive arm 64 does not immediately follow due to the friction of the contact areas on the mating side surfaces of the drive arm 64 and the U-shaped guiding portion 34 enhanced by the opposing biasing forces of the biasing springs 40 and 66. The drive arm 64 is translated inward and the lens carrier 20 follows the drive arm 64 as the lead screw 58 is rotated in the reverse direction in block S140 until the home position is reached changing the state of the home position switch 68 in step S140.

The tab 34 also engages the deployment lever end 30. The continued rotation of the drive motor 52 in step S144 causes the side surface of the drive arm 64 to lose contact with the side surface of the tab 34 and to rotate to the disengaged position in step S146. The drive motor 52 continues to rotate until the drive arm reaches its original starting position and is halted in step S148. At this point, the home position illustrated in FIG. 3 is returned to.

At this point, the user has the option to take another picture or to simply close the lens cover 14, since the auto-focus lens drive motor assembly 24 is disengaged. If further pictures are taken, the steps S108–S148 are repeated each time that the user composes a scene and fully depresses the shutter release button. Although not specifically shown, it will be understood that the user can repeatedly pre-range the scene and obtain indications of the suitability of the lighting conditions through partial depressions of the shutter release button in step S110 without committing to taking a picture and engaging the auto-focus drive mechanism 24. Then the user could simply close the lens cover 14 without taking a picture and no damage would be done to the lens 50.

When no further pictures are to be taken, the user can simply close the lens cover 14 is step S152, and the lens deployment mechanism of the present invention operates in steps S154–S158 as described above. At any time that the lens carrier 20 is in the deployed home position, the user can close the lens cover 14 because the drive arm 64 will be out of the way allowing the lens carrier 20 to follow the lens cover 14 to its parked position. In accordance with the present invention, the speed of operation of the auto-focus lens drive motor is no longer of concern since it is disengaged when any attempt to close the lens cover will likely be made.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LISTS FOR FIGS. 1–7
camera 10
cut-away camera body 12
lens cover 14
lens cover hinge ends 16 and 18
lens barrel or carrier 20
deployment lever 22
auto focus lens drive assembly 24
deployment lever hinge 26
deployment lever ends 28 and 30
tab 34
lens carrier barrel flange 36
U-shaped guide portion 38
bias spring 40
guide shaft 42
elongated sleeve 44
guide shaft 46
taking lens 50
drive motor 52
reduction gear 54
driven lead screw gear 56
lead screw 58
light chopper wheel 60
opto-sensor 62
eccentrically shaped drive arm 64
bias spring 66
home position switch 68
camera central processing unit 70
auto focus control subject distance measuring system 72
image capture or shutter release button 74
light measuring and exposure calculation system 76
shutter release/aperture setting mechanism 78
camera on/off switch 80
operating steps S100–S158

We claim:

1. An improved photographic camera having a camera body and a flip open lens cover that can be manually movable between a closed position covering and protecting a camera taking lens and an open position exposing the taking lens for photographing scenes further comprising:

a movable objective lens carrier for supporting said taking lens;

means for guiding said lens carrier for movement between a parked position when said lens cover is in said closed position and a home position deployed outward from said camera body when said lens cover is in said open position and a range of further in-focus positions;

lens deployment means interconnected between said lens cover and said lens carrier for effecting movement of said lens carrier along said lens carrier guiding means between said parked position and said home position in response to movement of said lens cover; and lens focus drive means operable by the user upon opening said lens cover to said open position for engaging with said lens carrier and moving said lens carrier on said guiding means from said home position to one of said in-focus positions prior to taking a picture, wherein said lens focus drive means further includes means for moving said lens carrier on said guiding means to said home position and for disengaging from said lens carrier immediately after a picture has been taken.

2. The camera of claim 1, wherein said lens focus drive means further comprises:

a drive motor selectively actuatable when said lens cover is in said open position to drive a lead screw in a first direction prior to taking a picture and in a second direction after a picture is taken; and drive means carried by said lead screw for engaging with said lens carrier when said drive motor is actuated to drive said lead screw in said first direction to move said lens carrier from said home position to said in-focus position and for engaging with said lens carrier when said drive motor is actuated to drive said lead screw in said second direction to move said lens carrier from said in-focus position to said home position and for disengaging from said lens carrier to allow said lens cover to close and return said lens carrier to said parked position.

3. The camera of claim 2, in which said lead screw and said drive means are mutually threaded so that said drive means is threaded onto said lead screw; and said drive means is rotationally movable into engagement with said lens carrier and translationally movable along said lead screw while engaged during rotational movement of said lead screw in said first and second directions to thereby move said lens carrier between said home and in-focus positions.

4. The camera of claim 1, in which said lens focus drive means further comprises a drive motor selectively actuatable when said lens cover is in said open position to drive a lead screw in a first direction prior to taking a picture; and drive means carried by said lead screw for engaging with said lens carrier when said drive motor is actuated to drive said lead screw in said first direction to move said lens carrier from said home position to one of said in-focus positions.

5. The camera of claim 4, in which said lead screw and said drive means are mutually threaded so that said drive means is threaded onto said lead screw; and said drive means is rotationally movable into engagement with said lens carrier and translationally movable along said lead screw while engaged during rotational movement of said lead screw in said first direction to thereby move said lens carrier from said home position to one of said in-focus positions.

6. The camera of claim 5, in which said drive motor is operable in a second direction after a picture is taken; and said drive means is movable into engagement with said lens carrier when said drive motor is actuated to drive said lead screw in said second direction to move said lens carrier from one of said in-focus positions to said home position and for disengaging from said lens carrier to allow said lens cover to close and return said lens carrier to said parked position.

7. The camera according to claim 6, wherein said drive means includes an eccentrically shaped drive arm which rotatably engages said lens carrier to allow said drive means to move said lens carrier from said home position to one of said in-focus positions.

8. The camera according to claim 7, wherein said drive arm is moved out of engagement with said lens carrier when said lens carrier is moved from said in-focus position to said home position.

9. The camera according to claim 7, wherein said drive arm is threaded onto said lead screw.

* * * * *